Sept. 23, 1924.
Re. 15,919
H. R. HOLMES
POWER TRANSMISSION FOR WHEELS
Original Filed Sept. 22, 1919 5 Sheets-Sheet 1
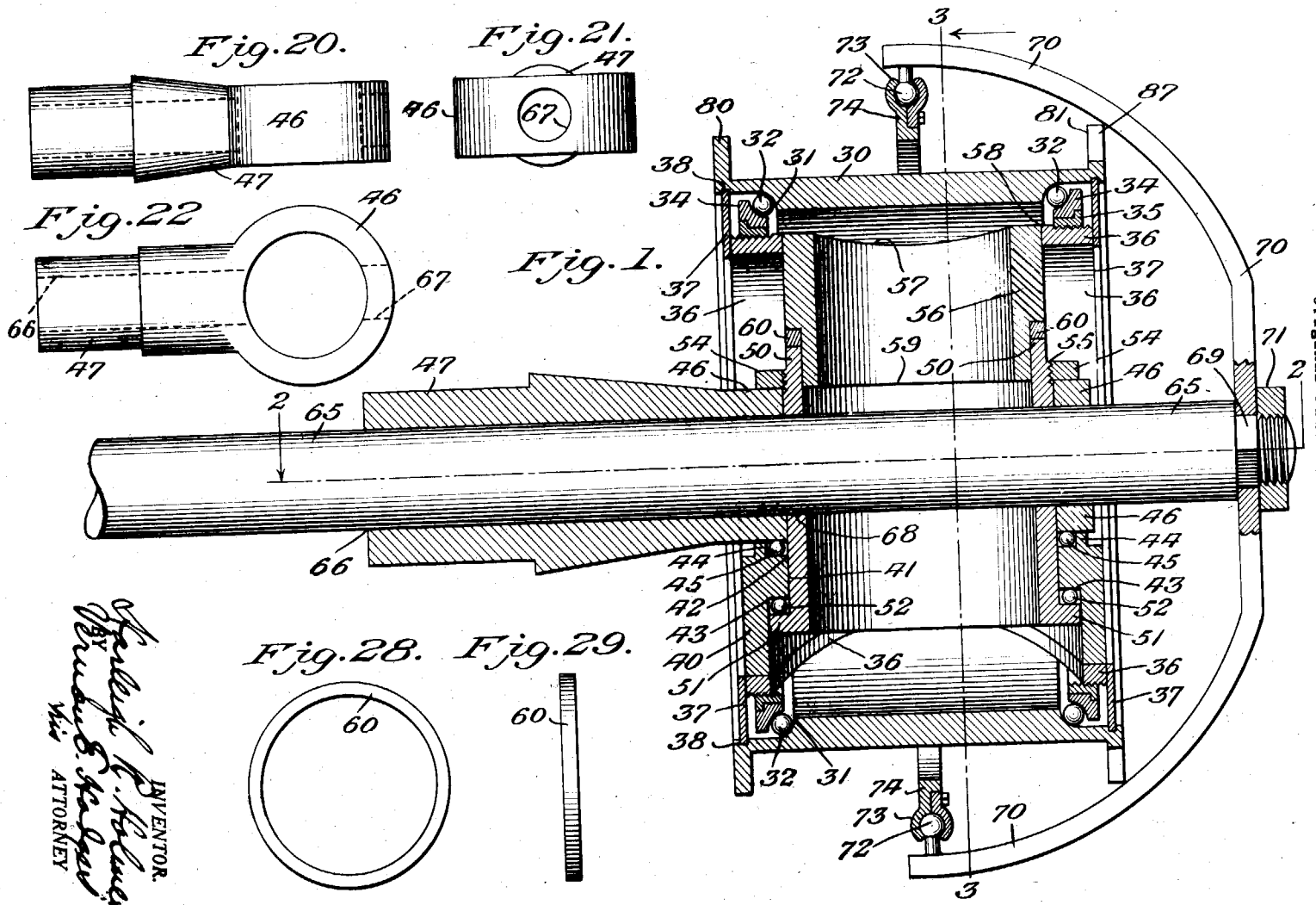
INVENTOR.
Harleigh R. Holmes
BY
Reuben E. Hodges
His ATTORNEY Sept. 23, 1924. Re. 15,919
H. R. HOLMES
POWER TRANSMISSION FOR WHEELS
Original Filed Sept. 22, 1919 5 Sheets-Sheet 2
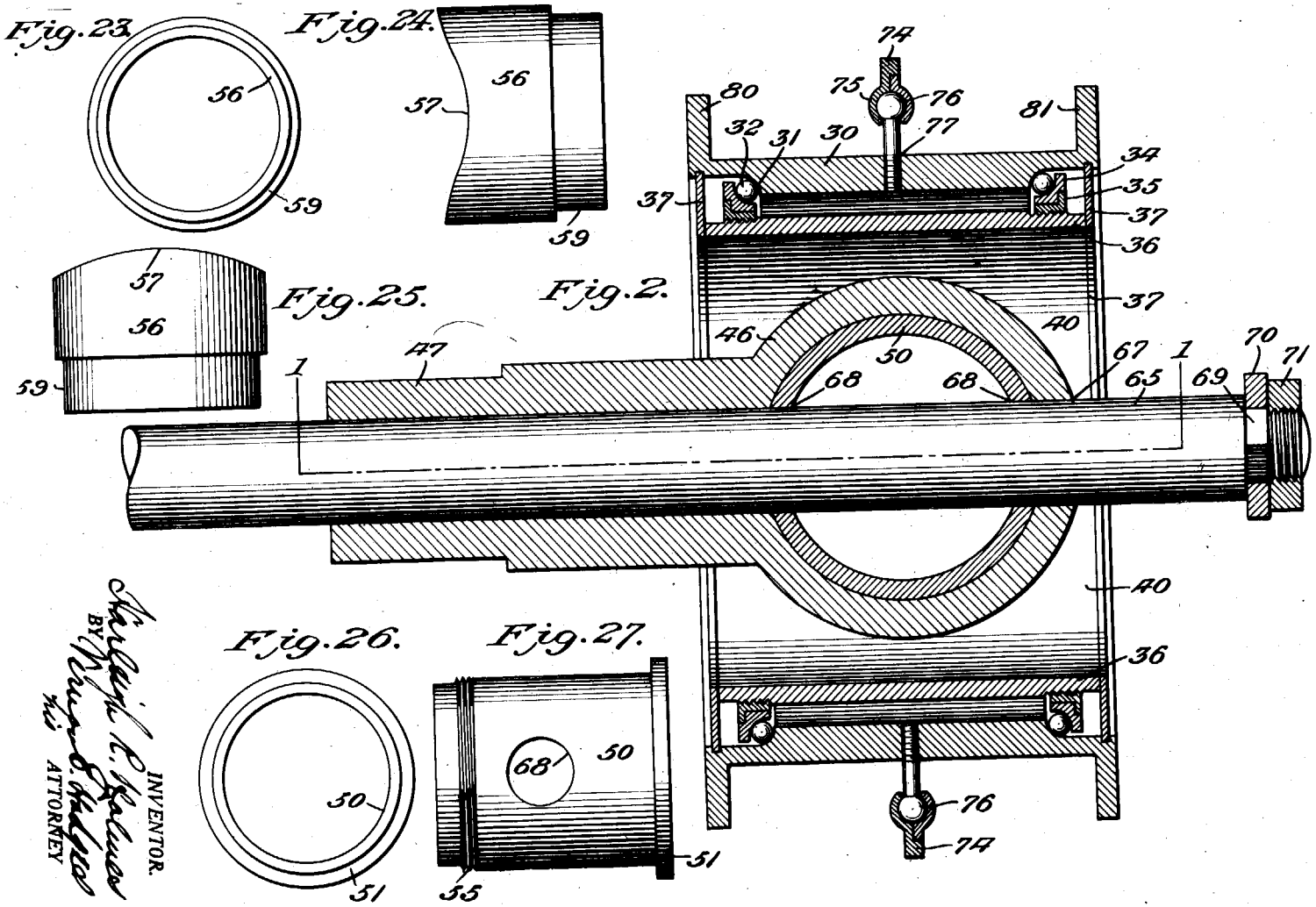
INVENTOR.
Harleigh R. Holmes
BY Vernon B. Hodges
his ATTORNEY Sept. 23, 1924. Re. 15,919
H. R. HOLMES
POWER TRANSMISSION FOR WHEELS
Original Filed Sept. 22, 1919 5 Sheets-Sheet 3
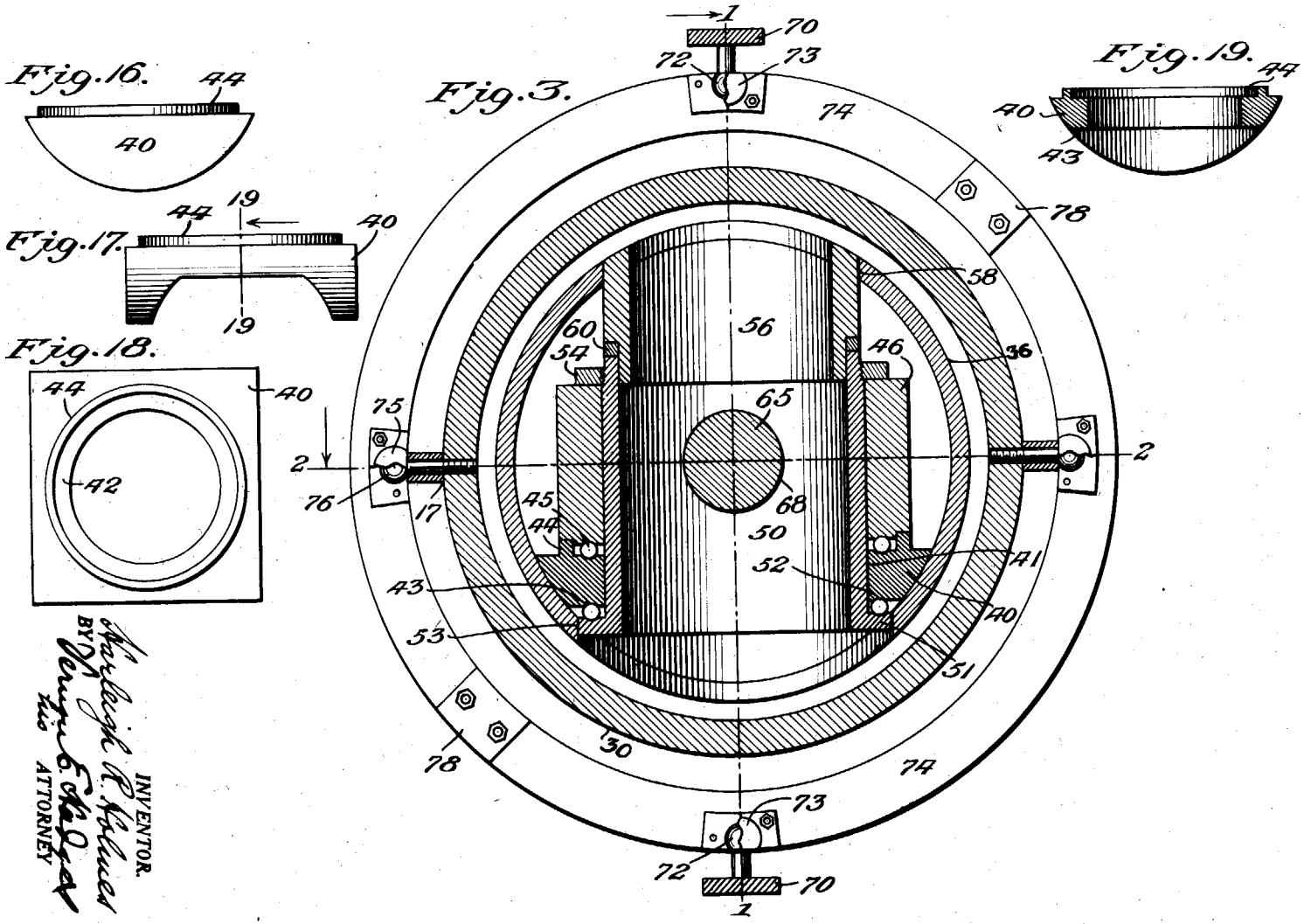
INVENTOR.
Harleigh R. Holmes
BY Vernon E. Hodges
his ATTORNEY Sept. 23, 1924. Re. 15,919

H. R. HOLMES

POWER TRANSMISSION FOR WHEELS

Original Filed Sept. 22, 1919 3 Sheets-Sheet 4

INVENTOR.
Harleigh R. Holmes
BY Vernon E. Hodges
his ATTORNEY

Sept. 23, 1924. Re. 15,919
H. R. HOLMES
POWER TRANSMISSION FOR WHEELS
Original Filed Sept. 22, 1919 5 Sheets-Sheet 5
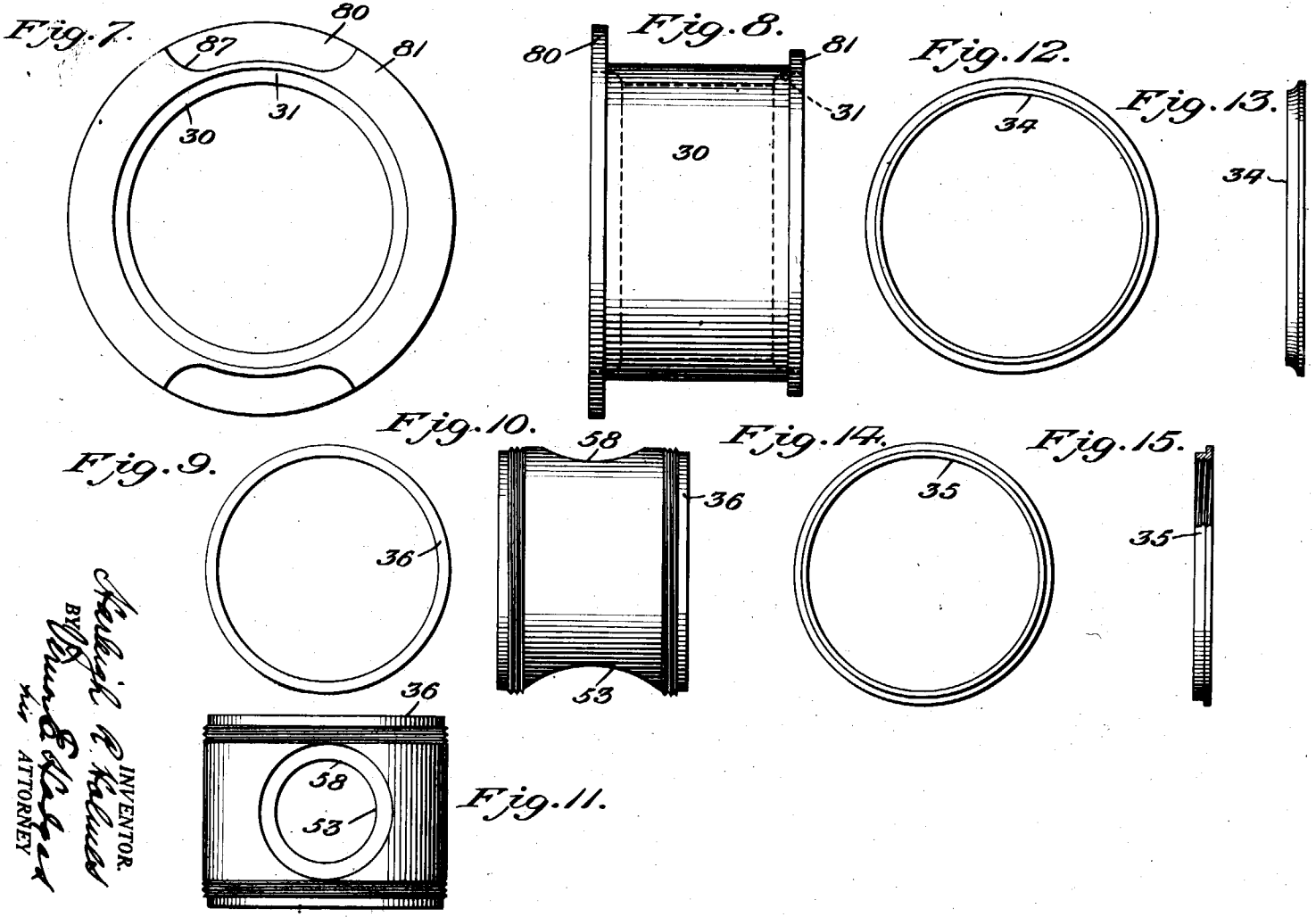
INVENTOR.
Harleigh R. Holmes
BY Vernon E. Hodges
his ATTORNEY Reissued Sept. 23, 1924. Re. 15,919

UNITED STATES PATENT OFFICE.

HARLEIGH R. HOLMES, OF DENVER, COLORADO, ASSIGNOR TO PLAINS MOTORS CORPORATION, OF DENVER, COLORADO.

POWER TRANSMISSION FOR WHEELS.

Original No. 1,377,131, dated May 3, 1921, Serial No. 325,476, filed September 22, 1919. Application for reissue filed March 20, 1923. Serial No. 626,399.

*To all whom it may concern:*

Be it known that I, HARLEIGH R. HOLMES, a citizen of the United States, residing at the city and county of Denver, State of Colorado, have invented an Improvement in Power Transmission for Wheels; and I do declare the following to be a full, clear, and exact description of the invention, such as will enable others skilled in the art to which it appertains to make and use the same, reference being had to the accompanying drawings, and to the characters of reference marked thereon, which form a part of this specification.

The object of this invention is to provide a device by means of which power may be transmitted to wheels and at the same time the wheels may be steered.

Briefly, the invention comprises a hub carrying a felly and tire rotatable about a horizontal shell within which is mounted a turntable on which there rests in turning relation an eye on the end of a stub axle. A cylindrical member passes through the turntable and the eye to position the latter on the turntable, and a driven shaft extends through the stub axle, the eye and said cylindrical member, the end of the shaft extending beyond the front face of the hub and being connected with a yoke, the ends of which are turned back over the outside of the hub and connected at diametrically opposed points by ball and socket joints with a ring which in turn is connected by intermediately positioned ball and socket joints to the hub. All of these ball and socket joints normally lie in the transverse median plane of the hub. By this construction power can be effectively transmitted to the hub during rotation of the same for steering purposes. This is an improvement on my Patent No. 1,289,763, granted December 31st, 1918.

In the drawings:

Figure 1 is a vertical longitudinal section taken on the lines 1—1 of Figs. 2 and 3.

Fig. 2 is a horizontal longitudinal section taken on the lines 2—2 of Figs. 1 and 3.

Fig. 3 is a vertical transverse section approximately on the line 3—3 of Fig. 1.

Figs. 7 and 8 are respectively front and side elevations of the hub proper.

Figs. 9, 10 and 11 are respectively front elevation, side elevation and bottom view of the horizontal shell mounted within the hub.

Figs. 12 and 13 are respectively face and edge elevations of one of the cones for entertaining the balls between the shell and the hub.

Figs. 14 and 15 are front and edge elevations of the retaining ring for the cone, a portion of Fig. 15 being broken away to show the internal threading.

Figs. 16, 17 and 18 (Sheet 3) are respectively front elevation, side elevation and plan view of the turntable positioned in the bottom of the shell.

Fig. 19 is a vertical transverse section through the turntable taken on the line 19—19 of Fig. 17.

Figs. 20, 21 and 22 (Sheet 1) are respectively side elevation, front elevation and plan view of the stub axle and its eye, which rest upon the turntable.

Figs. 23, 24 and 25 (Sheet 2) are respectively bottom view, side elevation and front elevation of the vertical sleeve at the top of the horizontal shell for positioning the upper portion of the vertical cylinder which retains the eye on the turntable.

Figs. 26 and 27 are respectively plan view and front view of the vertical cylinder, which positions the eye on the turntable.

Figs. 28 and 29 (Sheet 1) are face and edge views of the brass packing or spacing ring between the vertical sleeve and vertical cylinder of Figs. 23 to 27.

Figure 5:
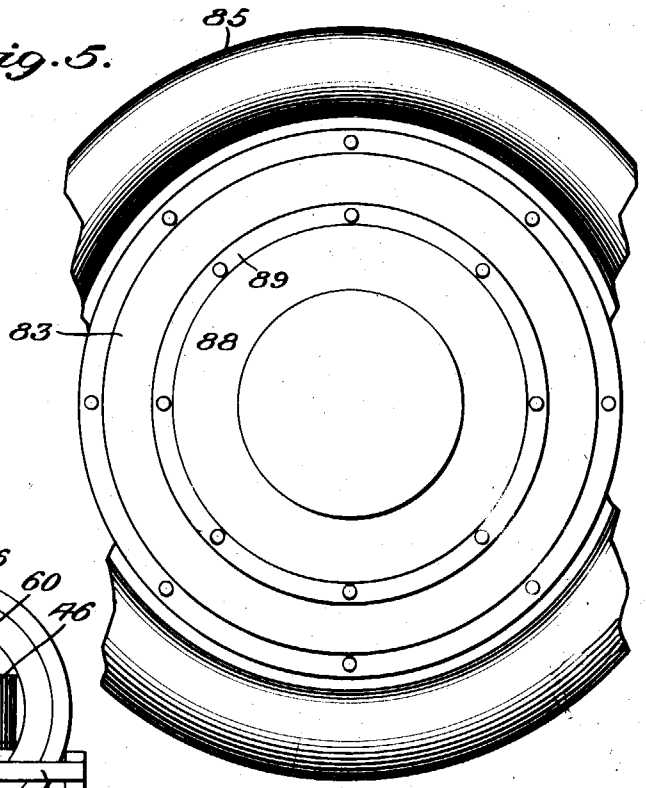
Fig. 5 is a partial front view from the line 5—5 of Fig. 4.
Figure 6:
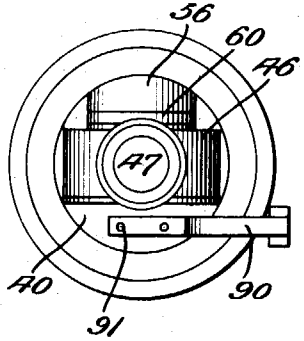
Fig. 6 is a rear view of the hub taken from the line 6—6 of Fig. 4 to show the attachment of the steering arm.

The hub 30 is provided interiorly adjacent its front and rear faces with ball races 31 for balls 32 retained by cones 34, which are held in position by retaining rings 35 threaded on to the horizontal shell 36. The shell 36 is retained in position within the hub 30 by means of annular rings 37 seated at 38 in grooves in the hub 30.

Mounted in the bottom of the shell 36 is a turntable 40, the lower portion of which is formed on a circle to fit the shell 36. The turntable has a vertical opening 41 and upper and lower ball races 42 and 43 are provided above and below this opening 41 respectively. Balls 45 and 52 are located in the races 42 and 43 respectively and the balls 45 are held in place by the ball retainer 44. The eye 46 of the fixed stub axle 47 rests upon the balls 45 and the turntable has a rotary motion with respect to the eye of the stub axle. A vertical cylinder 50, having a lower annular flange 51, formed with a ball race to receive balls 52, projects upwardly through the opening 41 of the turntable and through the eye 46, the balls 52 traveling on the ball race 43 of the turntable and on the flange 51 of the vertical positioning cylinder 50.

The under side of the shell 36 has a large circular opening 53 to permit passage of the cylinder 50 during assembling operations, and the turntable 40 has an open space of similar proportions.

A ring 54 is threaded on to the upper threaded portion 55 of the cylinder 50 to retain the cylinder in proper position within the turntable 40 and the eye 46. This ring 54 also serves as a means for adjustment to take up wear of the bearings. A vertical positioning sleeve 56 has its upper end 57 positioned in an opening 58 on the top of the shell 36, the opening 58 being smaller than the lower opening 53 in the shell. The opposite end of the vertical sleeve 56 is shouldered as shown at 59, and projects downwardly within the upper portion of the vertical cylinder 50 to assist in positioning the latter and to form a rigid pivot for the eye 46, in conjunction with the cylinder 50. A brass packing or spacing ring 60 is positioned on the top of the cylinder 50 and between the shoulder of the sleeve 56.

A drive shaft 65 passes through the longitudinal opening 66 in the stub axle 47, through the horizontally disposed opening 67 in the outer end of the eye 46, and through the openings 68 in the vertically positioned cylinder 50. The outer end of the shaft 65 extends beyond the front of the hub and is fixed as by a squared end 69, in a yoke 70 retained on the shaft 65 by a nut 71. The ends of the yoke are curved back over the middle of the hub 30 and are provided with joints comprising balls 72 and sockets 73, formed on a ring 74. These ball and socket joints 72 and 73 are diametrically opposed and at points equidistantly disposed between these ball and socket joints, a second pair of diametrically disposed joints is provided, comprising sockets 75 on the ring 74 and balls 76 connected with the hub 30 at 77. The joints 72, 73, are always positioned in the vertical transverse median plane of the eye 46 and vertical cylinder 50 and approximately at right angles to the shaft 65; this is because the yoke 70 maintains a definite relation with respect to the drive shaft 65 and the eye 46. The ball and socket joints 75, 76, normally are positioned in said median plane, that is, when the wheels are steered straight ahead. It is obvious that when the wheels are set at an angle the joints 75, 76, will be in a plane at an angle to the shaft 65. The joints 72, 73 and 75, 76 form a universal joint connection between the axle and the wheel. In order to compensate for changes in length due to changes in temperature any suitable connections 78 (Fig. 3) may be used.

Figure 4:
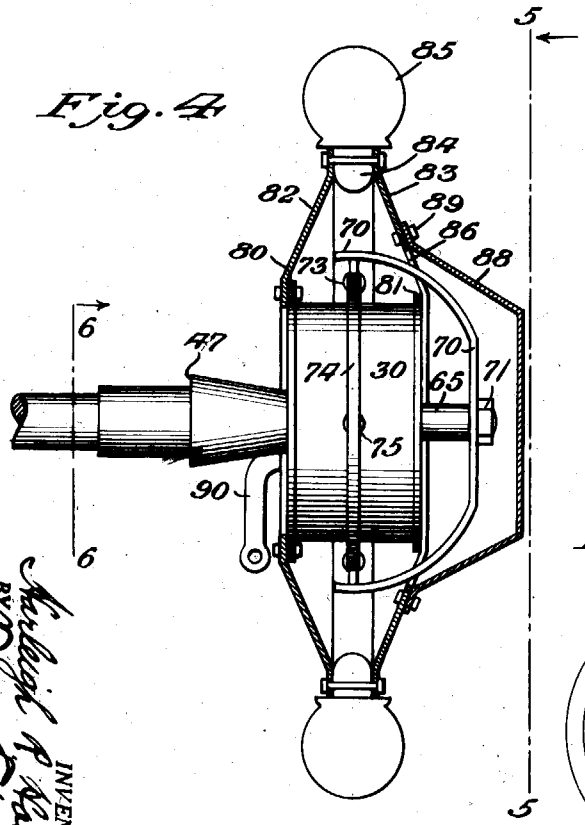
Fig. 4 is a view showing the hub, stub axle and transmission means in side elevation, and showing the plates connecting the hub with the felly and tire partially broken away to disclose the hub.

The hub 30 is provided with a rear annular flange 80 and a front annular flange 81 to which are bolted respectively rear and front plates 82 and 83, whose peripheries are in turn bolted to a felly 84, adapted to carry a rim and tire 85. The front plate 83 is cut away at 86, as shown in Fig. 4 to permit of the necessary amount of oscillation of the yoke 70; and the upper and lower parts of the flange 81 are also cut away as at 87 to permit this oscillation. The yoke 70 projects through the plate 83 and requires an additional housing cap 88, which is bolted to the front plate 83 to exclude dust, mud, rain and the like. A steering arm 90 is secured by means of screws 91 to the rear face of the turntable 40 to impart rotary steering motion to the shell 36 and hub 30.

From the foregoing, it will be clear that the turntable 40 will rotate beneath the eye 46 and about the cylinder 50 as a pivot, carrying with it the shell 36 and hub 30. The shaft 65 will retain its relation with respect to the eye 46, as will the yoke 70, and the steering motion of the hub 30 with reference to the yoke 70 will be permitted by the ball and socket joints 72, 73. The ball and socket joints 75, 76, will permit movement such as will enable the angularly disposed portions of the ring 74 to assume positions in vertical planes at angles to the axis of the shaft 65.

The joints 72, 73, will always travel in the vertical transverse median plane through the eye 46, which plane is perpendicular to the shaft 65, while the joints 75, 76 will travel in the vertical median plane of the hub 30 whatever its position may be. As long as the hub 30 is set in a given position, the path of movement of the joints 75, 76, will be in a given plane, but as the hub 30 is turned during the steering operation, the movement of these joints 75, 76, will be variable, the movement being a sort of oscillatory motion.

I claim:

1. A power transmission for vehicles including a shaft, a cylinder mounted thereon, a shell, means for connceting the shell with the cylinder, and a hub mounted upon the shell.

2. A power transmission for vehicles including a shaft, a cylinder mounted thereon, a shell connected with the cylinder, and a hub enclosing the cylinder and shell and capable of turning on two axes, one of which is coincident with the shaft, and the other with the central axis of the cylinder.

3. A power transmission for vehicles including a shaft, a cylinder mounted thereon, the axes of the shaft and cylinder intersecting at right-angles, a shell mounted upon the cylinder, and a hub capable of turning on two axes, one of which is coincident with the axis of the shaft, and the other with the central axis of the cylinder.

4. A power transmission for vehicles including a shaft, a cylinder mounted thereon, a shell mounted upon the cylinder and rotatably connected therewith, and a hub rotatably connected with the shell.

5. A power transmission for vehicles including a shaft, a hub surrounding a portion thereof, and a universal joint construction in the traction plane of a wheel and exteriorly of the hub.

6. A power transmission for vehicles including a hub, a drive-shaft, a yoke pivotally connected with the hub, a wheel, bearings on opposite sides of the pivotal points of the yoke, and a universal joint construction connecting the drive-shaft to the wheel, the center of the universal joint construction being coincident with the centers of the pivotal points of the yoke and of the wheel.

7. A power transmission for vehicles including a hub, a drive-shaft therein, a yoke pivotally connected with the hub, a wheel, bearings on opposite sides of the pivotal points of the yoke and mounting the wheel on the yoke, and a universal joint construction connecting the drive-shaft to the wheel, the center of the universal joint construction lying in the central plane of the wheel and being coincident with the centers of the pivotal points of the yoke and of the wheel.

8. A power transmission for motor vehicles including a hub, a drive-shaft therein, a yoke connected with the drive-shaft, means for pivotally connecting the yoke with the hub, a wheel having its center coincident with the center of said pivotal means, bearings on opposite sides of the pivotal points of the yoke and mounting the wheel on the yoke, and a universal joint construction concentric with the pivotal means and connecting said drive-shaft to the wheel.

9. A power transmission for vehicles including a hub, a drive-shaft therein, a wheel, a ring pivotally mounted at two diametrically opposite points on, and disposed around the hub, a yoke for operatively connecting the drive-shaft to the ring at two intermediate points, and pivots within the central plane of the wheel and the ring for connecting the yoke with the hub.

10. A power transmission for vehicles including an axle, a hub, a ring pivotally connected with the hub, and a yoke connected with the axle and pivotally connected with the ring at diametrically opposite points.

11. A power transmission for vehicles including an axle, a hub concentric therewith, a cylindrical element, a ring surrounding the hub and pivotally connected with the hub at two diametrically opposite points and means connected with the outer, ends of the axle and extending in opposite directions around the hub and pivotally connected to the ring at diametrically opposite points midway between the points of connection of the ring with the hub.

12. An axle, a hub rotatable about one end of said axle, a vertically disposed pivotal connection between the axle end and the hub and passing through said axle end, a drive shaft extending through the axle and hub to the front of the hub, and a connection between the forward end of the shaft and the outer sides of the hub.

13. A horizontal shell, a hub rotatable about said shell, an axle having one end extending into said shell, vertically disposed pivoting means mounted in said shell and passing through said axle, and a drive shaft extending through said axle to the front of said hub and shell, and a driving connection between the forward end of the shaft and the outer sides of the hub.

14. An axle, a hub rotatable about an end of the axle, a drive shaft extending through the axle and the hub, and a driving connection between the end of the shaft and the outer side of the hub, said connection comprising a yoke connected with the end of the shaft and extending in opposite directions and back over the hub, and an annular member pivotally connected with the overhanging oppositely disposed portions of the yoke and pivotally connected with the hub.

15. An axle, a hub rotatable about an end of the axle, a drive shaft extending through the axle and the hub, a driving connection between the end of the shaft and the outer side of the hub, said connection comprising a yoke connected with the end of the shaft and extending in opposite directions and back over the hub, and an annular member connected with the overhanging oppositely disposed portions of the yoke and pivotally connected with the hub.

16. A hub, an axle extending into the hub and about which the hub is rotatable, a drive shaft extending through the axle and the hub with its outer end positioned beyond the hub, and a driving connection between the outer shaft end and the outer surface of the hub, said connection comprising a yoke connected with the end of the shaft and extending in opposite directions and back over the hub, and an annular member pivotally connected with the overhanging oppositely disposed portions of the yoke and pivotally connected with the hub, said pivotal connections of said annular member comprising ball and socket joints.

17. An axle, a hub rotatable about the end thereof, a vertically disposed pivotal connection within the hub and between the hub and said axle end, a drive shaft extending through the axle and hub to the front of the hub, a yoke fixedly secured on the end of the shaft and extending in opposite directions and backward to overhang the outer sides of the hub, and connections between the hub and the overhanging portions of the yoke.

18. An axle, a hub rotatable about the end thereof, a vertically disposed pivotal connection within the hub and between the hub and said axle end, a drive shaft extending through the axle and hub to the front of the hub, a yoke fixed on the end of the shaft and extending in opposite directions and backward to overhang the outer sides of the hub, and connections between the hub and the overhanging portions of the yoke, the last mentioned connections comprising an outer member positioned around the hub having pivotal connections with the overhanging yoke portions, and also having pivotal connections with the hub at points intermediate the points of connection with the yoke.

19. An axle, a hub rotatable about the end thereof, a vertically disposed pivotal connection within the hub and between the hub and said axle end, a drive shaft extending through the axle and hub to the front of the hub, a yoke fixed on the end of the shaft and extending in opposite directions and backward to overhang the outer sides of the hub, and connections between the hub and the overhanging portions of the yoke, the last mentioned connections comprising an outer member positioned around the hub having pivotal connections with the overhanging yoke portions, and also having pivotal connections with the hub at points intermediate the points of connection with the yoke, the pivot points between said outer member and the yoke normally being located in a vertical plane at right angles to said shaft and passing through the axis of said vertical pivotal connection.

20. A horizontal shell, a hub rotatable about said shell, an axle having one end extending into said shell, vertically disposed pivoting means fixed in said shell and connected with said axle end, a drive shaft extending through said axle to the front of said hub and shell, and a driving connection between the forward end of the shaft and the outer sides of the hub.

21. A horizontal shell, a hub rotatable about said shell, an axle having one end extending into said shell, vertically disposed pivoting means fixed in said shell and connected with said axle end, a drive shaft extending through said axle to the front of said hub and shell, a yoke fixed to the forward end of the shaft and extending in opposite directions and backward to overhang the outer sides of the hub, and connections between the overhanging ends of the yoke and the outer sides of the hub.

22. A horizontal shell, a hub rotatable about said shell, an axle having one end extending into said shell, vertically disposed pivoting means mounted in said shell and connected with said axle end, a drive shaft extending through said axle to the front of said hub and shell, a yoke fixed to the forward end of the shaft and extending in opposite directions and backward to overhang the outer sides of the hub, and connections between the overhanging ends of the yoke and the outer sides of the hub, the last mentioned connections comprising an outer member positioned around the hub having pivotal connections with the overhanging yoke portions, and also having pivotal connections with the hub at points intermediate the points of connection with the yoke.

23. A horizontal shell, a hub rotatable about said shell, an axle having one end extending into said shell, vertically disposed pivoting means mounted in said shell and connected with said axle end, a drive shaft extending through said axle to the front of said hub and shell, a yoke fixed to the forward end of the shaft and extending in opposite directions and backward to overhang the outer sides of the hub, and connections between the overhanging ends of the yoke and the outer sides of the hub, the last mentioned connections comprising an outer member positioned around the hub having pivotal connections with the overhanging yoke portions, and also having pivotal connections with the hub at points intermediate the points of connection with the yoke, the pivot points between said outer member and the yoke normally being located in a vertical plane at right angles to said shaft and passing through the axis of said vertical pivotal connection.

24. A horizontal shell, a hub rotatable about said shell, an axle having one end extending into said shell, vertically disposed pivoting means mounted in said shell and connected with said axle end, a drive shaft extending through said axle to the front of said hub and shell, a yoke fixed to the forward end of the shaft and extending in opposite directions and backward to overhang the outer sides of the hub, connections between the overhanging ends of the yoke and the outer sides of the hub, the last mentioned connections comprising an outer member positioned around the hub having pivotal connections with the overhanging yoke portions, and also having pivotal connections with the hub at points intermediate the points of connection with the yoke, the pivot points between said outer member and the yoke normally being located in a vertical plane at right angles to said shaft and passing through the axis of said vertical pivotal connection, and means connected with the shell for turning the hub upon a vertical axis.

25. A horizontal shell, a hub rotatable about said shell, an axle having one end extending into said shell, vertically disposed pivoting means mounted in said shell and passing through and cannected with said axle end, a drive shaft extending through said axle to the front of said hub and shell, and a driving connection between the forward end of the shaft and the outer sides of the hub.

26. A horizontal shell, a hub rotatable about said shell, an axle having one end extending into said shell, vertically disposed pivoting means mounted in said shell and passing through said axle end, a drive shaft extending through said axle to the front of said hub and shell, a yoke fixed to the forward end of the shaft and extending in opposite directions and backward to overhang the outer sides of the hub, and connections between the overhanging ends of the yoke and the outer sides of the hub.

27. A horizontal shell, a hub rotatable about said shell, an axle having one end extending into said shell, vertically disposed pivoting means mounted in said shell and passing through and connected with said axle end, a drive shaft extending through said axle to the front of said hub and shell, a yoke fixed to the forward end of the shaft and extending in opposite directions and backward to overhang the outer sides of the hub, and connections between the overhanging ends of the yoke and the outer sides of the hub.

28. A horizontal shell, a hub rotatable about said shell, an axle having one end extending into said shell, vertically disposed pivoting means fixed in said shell and passing through said axle end, a drive shaft extending through said axle to the front of said hub and shell, and a driving connection between the forward end of the shaft and the outer sides of the hub.

29. An axle, a hub rotatable about one end of said axle, a vertically disposed pivotal connection between the axle end and the hub and passing through said axle end, said pivotal connection being adjustable, a drive shaft extending through the axle and hub to the front of the hub, and a connection between the forward end of the shaft and the outer sides of the hub.

30. A horizontal shell, a hub rotatable about said shell, an axle having one end extending into said shell, a vertically disposed pivoting means fixed in said shell and passing through said axle end, said pivoting means being adjustable, a drive shaft extending through said axle to the front of said hub and shell, and a driving connection between the forward end of the shaft and the outer sides of the hub.

In testimony whereof I affix my signature.

HARLEIGH R. HOLMES.